US012722722B2

(12) United States Patent
Keatley

(10) Patent No.: US 12,722,722 B2
(45) Date of Patent: Sep. 1, 2026

(54) FIFTH WHEEL HITCH PLATE SURFACES WITH PATTERNED GREASE RELIEFS

(71) Applicant: SAF-HOLLAND, Inc., Muskegon, MI (US)

(72) Inventor: Justin D. Keatley, Zeeland, MI (US)

(73) Assignee: SAF-Holland, Inc., Muskegon, MI (US)

( * ) Notice: Subject to any disclaimer, the term of this patent is extended or adjusted under 35 U.S.C. 154(b) by 716 days.

(21) Appl. No.: 18/156,091

(22) Filed: Jan. 18, 2023

(65) Prior Publication Data

US 2023/0322312 A1 Oct. 12, 2023

Related U.S. Application Data

(60) Provisional application No. 63/301,303, filed on Jan. 20, 2022.

(51) Int. Cl.
*B62D 53/08* (2006.01)

(52) U.S. Cl.
CPC ......... *B62D 53/0842* (2013.01); *B62D 53/08* (2013.01)

(58) Field of Classification Search
CPC ..... B62D 53/0842; B62D 53/08; B60D 1/015
See application file for complete search history.

(56) References Cited

U.S. PATENT DOCUMENTS 2,371,750 A 3/1945 Fontaine
2,885,222 A 5/1959 Walther, Sr. et al.
4,307,669 A 12/1981 Koester et al.
D289,514 S 4/1987 Capps
5,263,856 A * 11/1993 Huehn .............. B62D 53/0885 280/433
5,431,424 A * 7/1995 Colwell ............ B62D 53/0885 280/433
6,098,754 A 8/2000 Toner
6,199,889 B1 3/2001 Golembiewski et al.
6,520,527 B2 2/2003 Laarman
7,036,839 B2 * 5/2006 Hungerink .............. F16N 15/02 280/433
D538,205 S 3/2007 Roth-Schuler
D670,211 S 11/2012 Stanifer et al.
D670,212 S 11/2012 Stanifer et al.
8,602,438 B2 * 12/2013 Stanifer ............ B62D 53/0885 280/433

(Continued)

FOREIGN PATENT DOCUMENTS

CN 205674798 U 11/2016
DE 3153012 C2 12/1984
GB 1559126 A 1/1980

*Primary Examiner* — Valentin Neacsu
*Assistant Examiner* — Marlon A Arce
(74) *Attorney, Agent, or Firm* — Price Heneveld LLP

(57) ABSTRACT

A fifth wheel hitch plate arrangement includes a mounting portion configured to be coupled to a vehicle frame, a kingpin throat configured to receive a kingpin of a towed vehicle therein, and a body portion supported by the mounting portion, the body portion including an upper surface configured to abut a mating surface of the towed vehicle, a bottom surface opposite the upper surface, and a plurality of reliefs extending from the upper surface toward the bottom surface, wherein the plurality of reliefs are closed at a bottom end thereof, and wherein the plurality of reliefs are spaced about the upper surface in a repeating pattern.

23 Claims, 9 Drawing Sheets

(56) References Cited

U.S. PATENT DOCUMENTS 9,238,390 B2 * 1/2016 Loukus .............. B62D 53/0885
9,327,782 B2 5/2016 Alldredge et al.
9,738,333 B2 8/2017 Alldredge et al.
9,956,608 B2 * 5/2018 Loukus .............. B62D 53/0885

* cited by examiner 54
26a
50
52
18a
40a 26a
40a
IV C
52

18a
52
44a
40a
26a
42a
56

18b
44b
40b
26b
58
56b
42b
28b

FIFTH WHEEL HITCH PLATE SURFACES WITH PATTERNED GREASE RELIEFS

CROSS-REFERENCE TO RELATED APPLICATIONS

This application claims the benefit of U.S. Provisional Patent Application No. 63/301,303, filed on Jan. 20, 2022, entitled "FIFTH WHEEL HITCH PLATE SURFACES WITH PATTERNED GREASE RELIEFS," the entire disclosure of which is incorporated herein by reference.

BACKGROUND OF THE INVENTION

The embodiments as disclosed herein relate to a vehicle coupling system between a towing vehicle and a towed vehicle, and in particular to fifth wheel hitch arrangement that includes a plurality of patterned reliefs configured to receive a lubricant such as grease therein.

BRIEF SUMMARY OF THE INVENTION

One embodiment disclosed herein includes a fifth wheel hitch plate that includes a mounting portion configured to be coupled to a vehicle frame, a kingpin throat configured to receive a kingpin of a towed vehicle therein, and a body portion supported by the mounting portion, the body portion including an upper surface configured to abut a mating surface of the towed vehicle, a bottom surface opposite the upper surface, and a plurality of reliefs extending from the upper surface toward the bottom surface, wherein the plurality of reliefs are closed at a bottom end thereof, and wherein the plurality of reliefs are spaced about the upper surface in a repeating pattern.

Another embodiment as disclosed herein includes a fifth wheel hitch plate that includes a mounting portion configured to be coupled to a vehicle frame, a kingpin throat configured to receive a kingpin of a towed vehicle therein, and a body portion supported by the mounting portion, the body portion including an upper surface configured to abut a mating surface of the towed vehicle, a bottom surface opposite the upper surface, and a plurality of reliefs extending from the upper surface toward the bottom surface, wherein the plurality of reliefs are closed at a bottom end thereof, and wherein the at least one of the plurality of reliefs is equally space from at least three adjacent reliefs of the plurality of reliefs.

Yet another embodiment as disclosed herein includes a fifth wheel hitch plate that includes a mounting portion configured to be coupled to a vehicle frame, a kingpin throat configured to receive a kingpin of a towed vehicle therein, and a body portion supported by the mounting portion, the body portion including an upper surface configured to abut a mating surface of the towed vehicle, a bottom surface opposite the upper surface, and a plurality of reliefs extending from the upper surface toward the bottom surface, and wherein the plurality of reliefs are spaced in concentric circles.

The principal objects of the embodiments as disclosed herein are to provide a fifth wheel hitch arrangement that is relatively lightweight, increases the expected life of the associated components by improving dispersion of lubricants such as grease across a support surface of the associated fifth wheel hitch plate, allows for easy and quick assembly, is economical to manufacture, and is particularly well adapted for the proposed use.

These and other features, advantages of the embodiments as disclosed herein will be further understood and appreciated by those skilled in the art by reference to the following specification, claims, and appended drawings.

DETAILED DESCRIPTION

Figure 1:
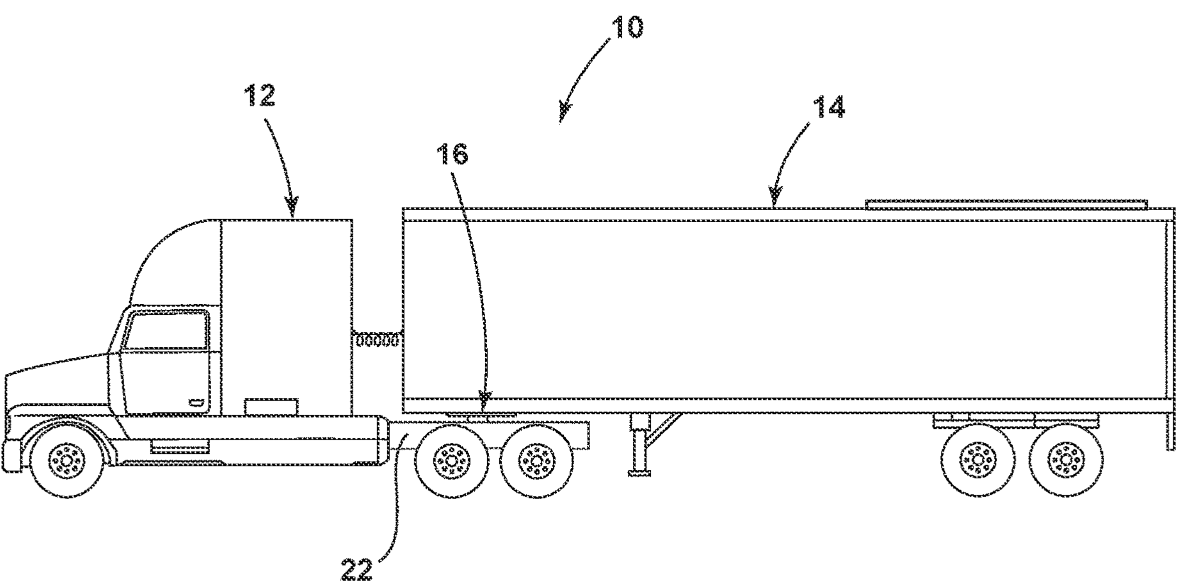
FIG. 1 is a side elevational view of a vehicle arrangement, including a towing vehicle, such as a semi-truck, and a towed vehicle, such as a semi-trailer.
Figure 2:
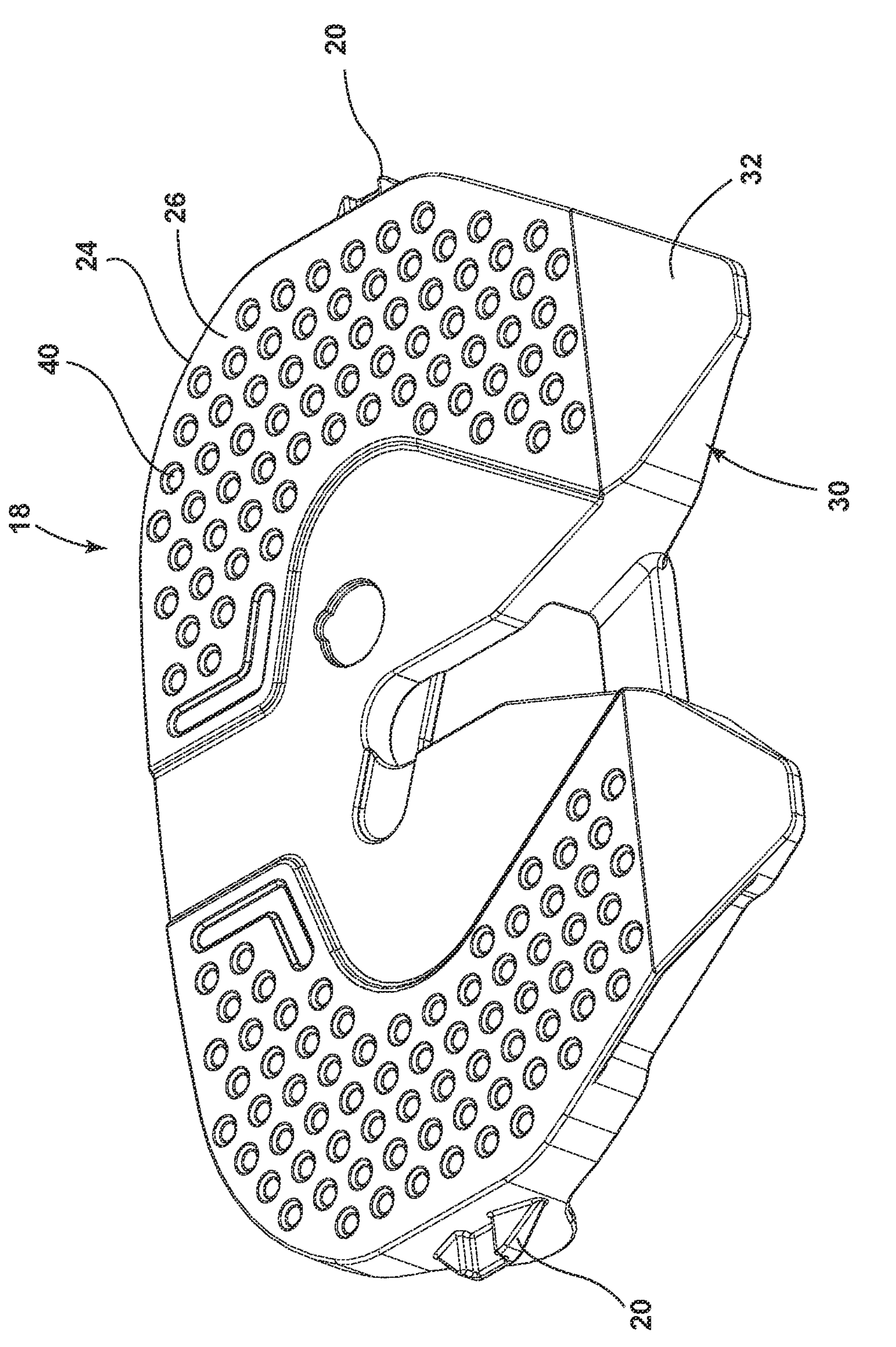
FIG. 2 is a perspective view of a fifth wheel hitch plate assembly of a fifth wheel hitch arrangement.

For purposes of description herein, the terms "upper," "lower," "right," "left," "rear," "front," "vertical," "horizontal," and derivatives thereof shall relate to the invention as oriented in FIGS. 1 and 2. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other characteristics relating to the embodiments disclosed herein are not to be considered as limiting, unless the claims expressly state otherwise.

The reference numeral 10 (FIG. 1) generally designates a vehicle arrangement that includes a towing vehicle 12 and a towed vehicle 14 coupled to one another via a fifth wheel hitch arrangement 16. In the illustrated example, the towing vehicle 12 includes a semi-truck while the towed vehicle 14 includes a semi-trailer.

The fifth wheel hitch arrangement 16 includes a fifth wheel hitch plate assembly 18 (FIG. 2) that includes a pair of mounting portions 20 configured to pivotably couple with a pair of mounting brackets (not shown) in a manner as well known in the art, thereby pivotably supporting the fifth wheel hitch plate assembly 18 from a truck frame 22. The fifth wheel hitch plate assembly 18 further includes a body portion 24 having an upper surface configured to abut a downwardly facing mating surface or support surface (not shown) of the trailer 14 during operation of the vehicle arrangement 10. The body portion 24 further includes a lower surface 28 (FIG. 3) opposite the upper surface 26. A kingpin throat 30 extends into the body portion 24 and includes a widened portion 32 and a pivot portion 34, each configured to receive the kingpin 36 therein that is fixedly secured to the trailer 14. In the illustrated example, the kingpin 36 is received and pivotably locked within the pivot portion 34 during operation of the coupled vehicle arrangement 10 such that the kingpin 36 pivots within the pivot portion 34 about a pivot axis 38.

In the illustrated example, the body portion 24 of the fifth wheel hitch plate assembly 18 includes a plurality of reliefs 40 extending from the upper surface 26 toward the bottom surface 28, with each relief 40 including a bottom wall 42, thereby defining a relief 40 of a given depth. In the illustrated example, each relief 40 is conically-shaped and includes a beveled sidewall 44.

Figure 3A:
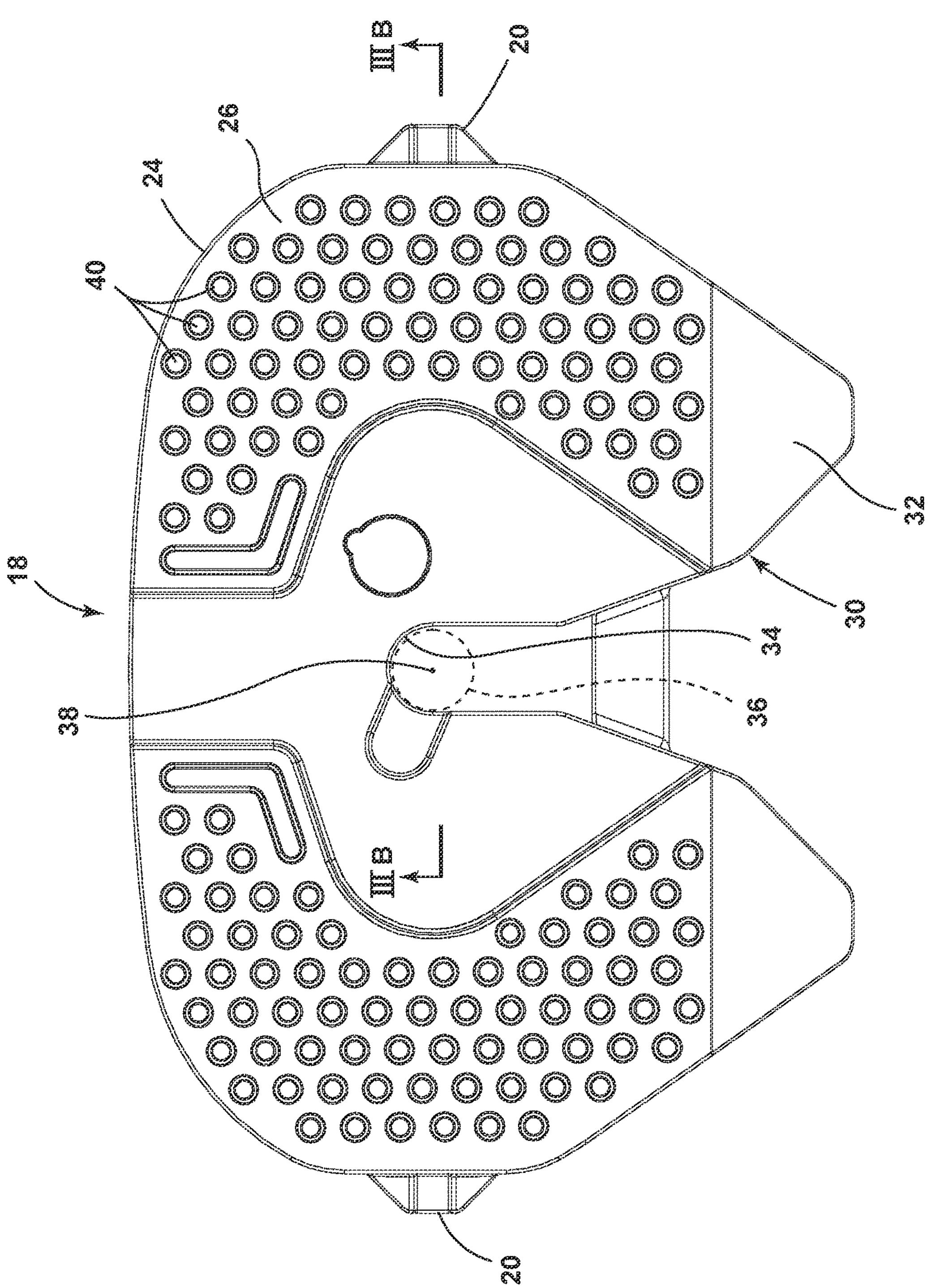
FIG. 3A is a top plan view of the fifth wheel hitch plate assembly of FIG. 2.
Figures 3B, 3C, 3D:
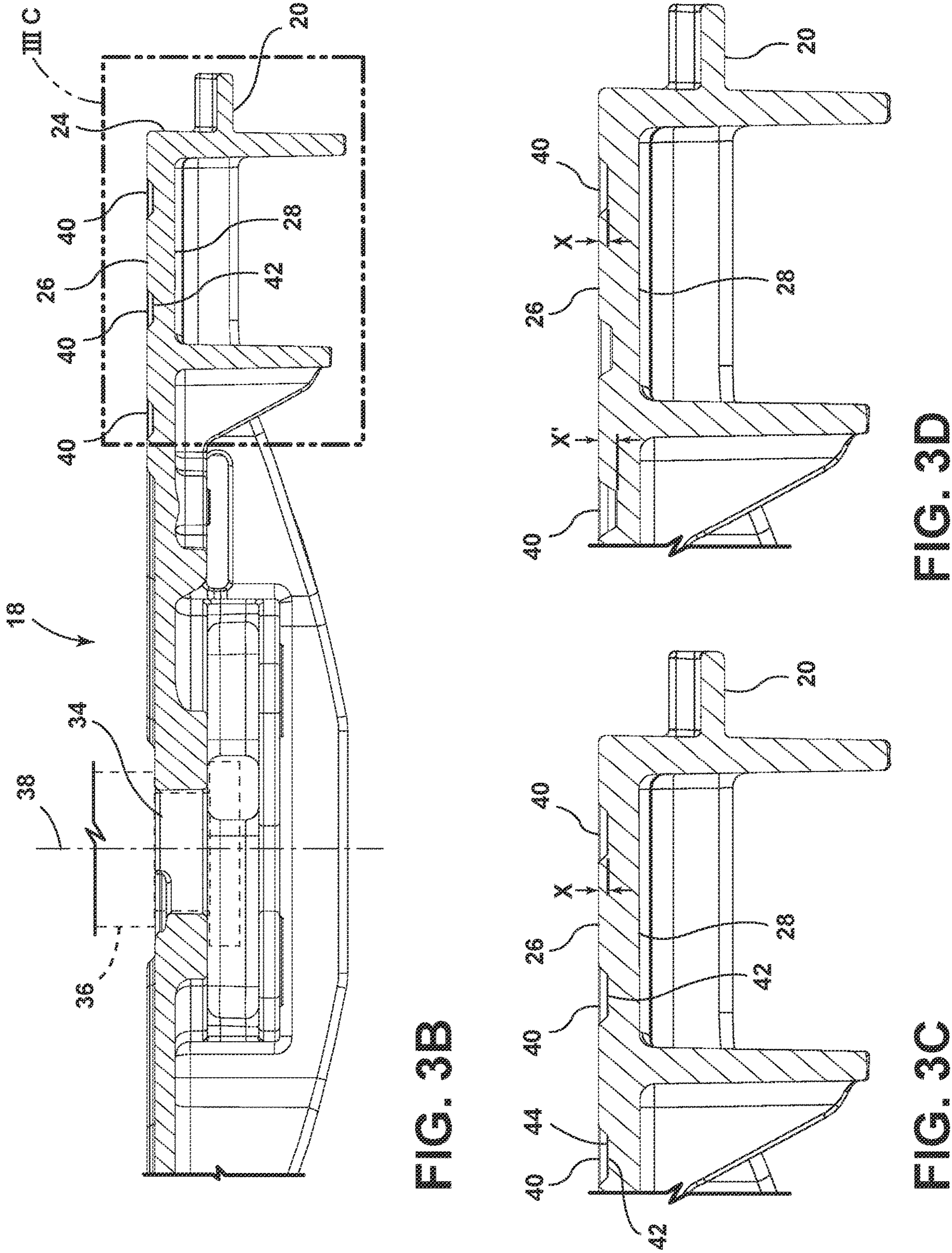
FIG. 3B is a cross-sectional rear elevational view of the fifth wheel hitch plate assembly taken along the line IIIB-IIIB, FIG. 3A.
FIG. 3C is an enlarged cross-sectional rear elevational view of the area IIIC, FIG. 3B.
FIG. 3D is an enlarged cross-sectional rear elevational view of an alternative embodiment of the fifth wheel hitch plate assembly.

As best illustrated in FIG. 3A, the plurality of reliefs 40 are spaced about a majority of the upper surface 26. In the illustrated example, the reliefs 40 cooperate to form a pattern where the reliefs in each row are aligned with one another in a longitudinal direction, are aligned with one another in a diagonal direction, and are offset from the reliefs 40 in each adjacent row in the lateral direction. Each relief 40 is equally spaced from at least three other adjacent reliefs 40, while some reliefs 40 may be equally spaced from up to six adjacent reliefs 40. Each relief 40 extends from the upper surface 26 toward the lower surface 28 to a depth x (FIG. 3C). Alternatively, as best illustrated in FIG. 3D, the depth of the reliefs 40 may extend to varying comparative depths, including a first depth x, and a greater depth x'. It is noted that the locations or patterns formed by the plurality of reliefs 40 as well as the relative depths of the reliefs 40 may be altered to allow management of and promote the progression of lubricant or grease across the surface of the upper surface 26 during operation of the vehicle arrangement 10. It is noted that the apertures extend only partially from the upper surface 26 toward the lower surface 28, thereby maintaining the lubricant above the fifth wheel hitch plate assembly and eliminating the need for a self or auto lubricating system, thereby reducing the relative cost of the fifth wheel hitch arrangement.

Figures 4A, 4B, 4C, 4D:
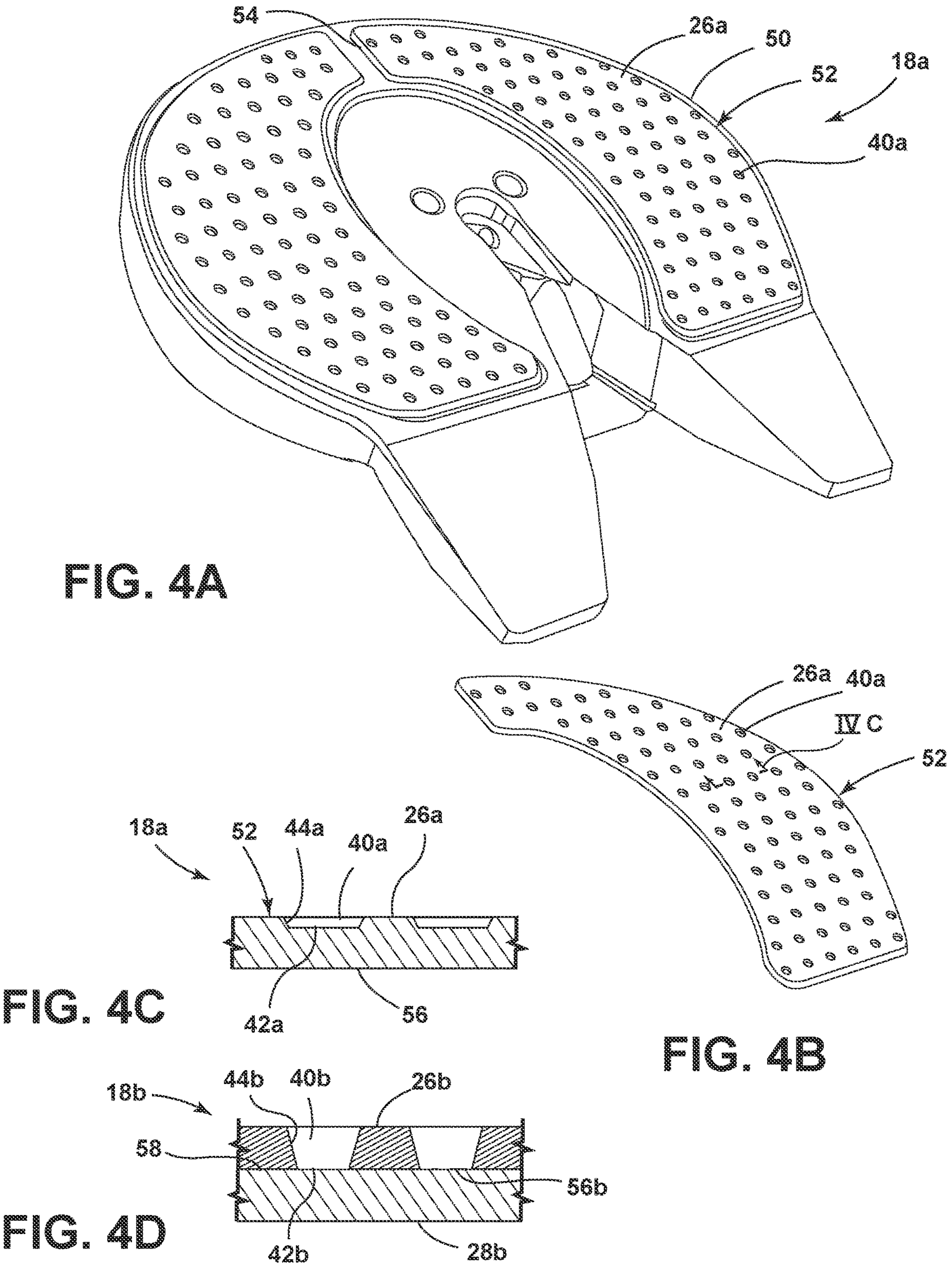
FIG. 4A is a perspective view of an alternative embodiment of a fifth wheel hitch plate assembly that includes a fifth wheel hitch plate and a separate wear plate.
FIG. 4B is a perspective view of the wear plate.
FIG. 4C is a cross-sectional rear elevational view of the wear plate taken along the line IVC-IVC, FIG. 4B.
FIG. 4D is a cross-sectional rear elevational view of an alternative embodiment of the fifth wheel hitch plate assembly.

Alternatively, the fifth wheel hitch plate assembly 18*a* (FIG. 4A) may include a fifth wheel hitch plate 50 and one or more wear plates 52. The reference numeral 18*a* generally represents another embodiment of the fifth wheel hitch plate assembly 18. Since the fifth wheel hitch plate assembly 18*a* is similar to the previously described fifth wheel hitch plate assembly 18, similar parts appearing in FIGS. 1-3B and FIGS. 4A and 4B are respectively represented by the same, corresponding reference numeral, except for the suffix "a" in the numerals of the latter. In the illustrated example, a pair of wear plates 52 (FIGS. 4A and 4B) are positioned within corresponding upwardly-opening pockets 54. Each wear plate 52 has a generally planar arcuate-shape which cooperate to overlay the general plan area of the fifth wheel hitch plate 50. Each wear plate 52 includes a plurality of reliefs 40*a* similar to the reliefs 40 of the fifth wheel hitch plate assembly 18. As best illustrated in FIG. 4C, the reliefs 40*a* extend only partially from an upper surface 26*a* of the fifth wheel hitch plate assembly 18*a* toward a lower surface 56 of the wear plate 52. Alternatively, as best illustrated in FIG. 4D each of the reliefs 40*b* extend completely through the wear plate 52 between the upper surface 26*a* and the lower surface 56. In this example, the lower end of each of the reliefs 40*b* are closed off by an upper surface 58 of the fifth wheel hitch plate 50*a*, where the upper surface 26*b* of the fifth wheel hitch plate assembly 18*b* is defined by the upper surface of the wear plate 52 and the lower surface 28*b* of the fifth wheel hitch plate assembly 18*b* is defined by the lower surface of the fifth wheel hitch plate 58. In the illustrated example, the fifth wheel hitch plate 50 may comprise steel, particularly cast steel, while the replaceable wear plate 52 may comprise polyethylene.

Figure 5A:
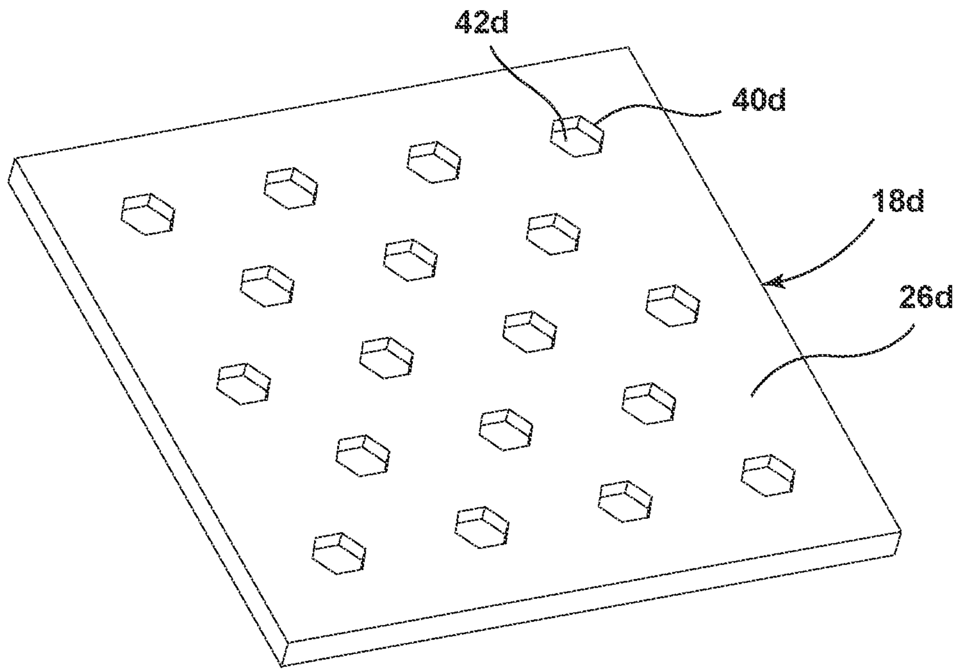
FIG. 5A is a perspective view of an alternative embodiment of a pattern of reliefs where the reliefs are staggered and include a hexagonal cross-sectional configuration.
Figure 5B:
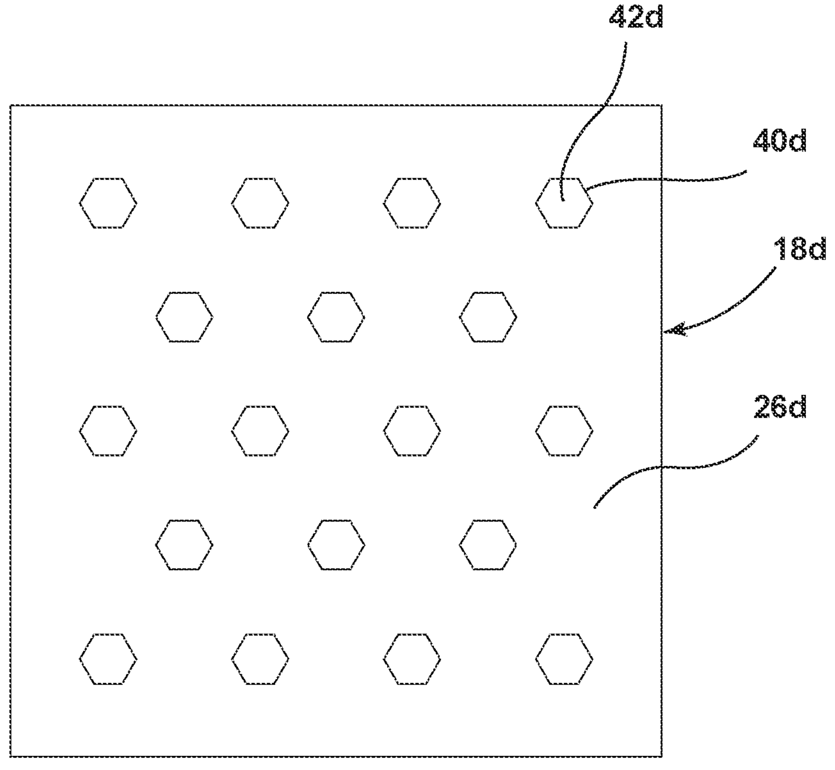
FIG. 5B is a top plan view of the embodiment as shown in FIG. 5A.

Alternatively, the reliefs that extend into the fifth wheel hitch plate assembly may cooperate to form various patterns and may each be provided various geometrical cross-sectional configurations. For example, as best illustrated in FIGS. 5A and 5B, each relief 40*d* is provided a hexagonally-shaped cross-sectional configuration. The plurality of reliefs 40*d* are spaced about the upper surface 26*d* of the fifth wheel hitch plate assembly 18*d* such that the reliefs 40*d* are staggered from one another in both the longitudinal and lateral directions, while each relief 40*d* is equally spaced from at least three adjacent reliefs 40*d*. In the illustrated example, some of the reliefs 40*d* may be equally spaced from up to six adjacent reliefs 40*d*.

Figure 6A:
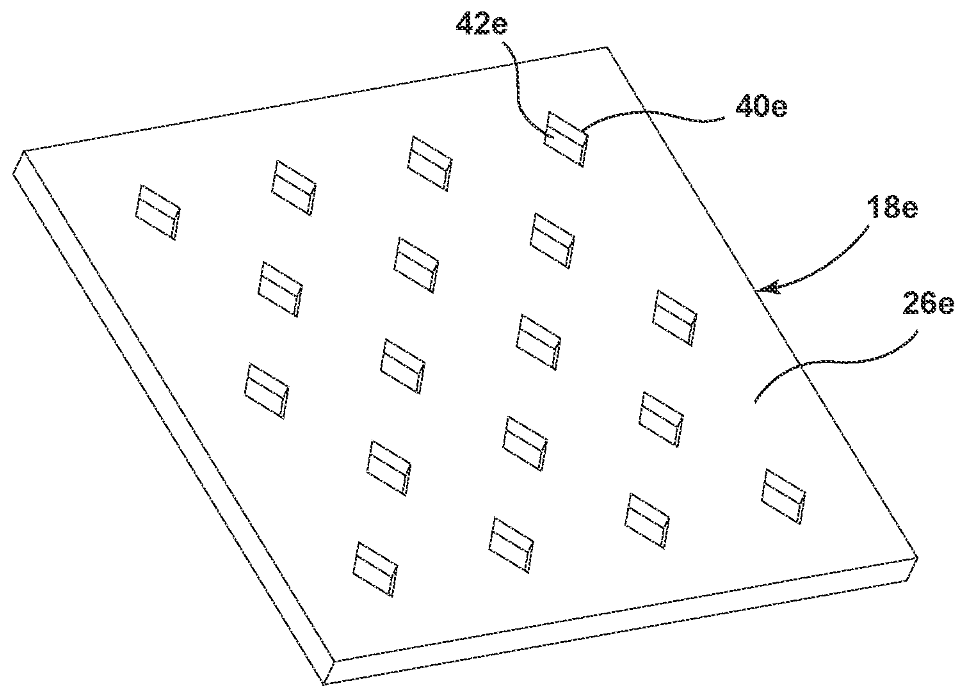
FIG. 6A is an alternative embodiment of the pattern of reliefs where the pattern of reliefs are staggered and include a diamond-shaped cross-sectional configuration.
Figure 6B:
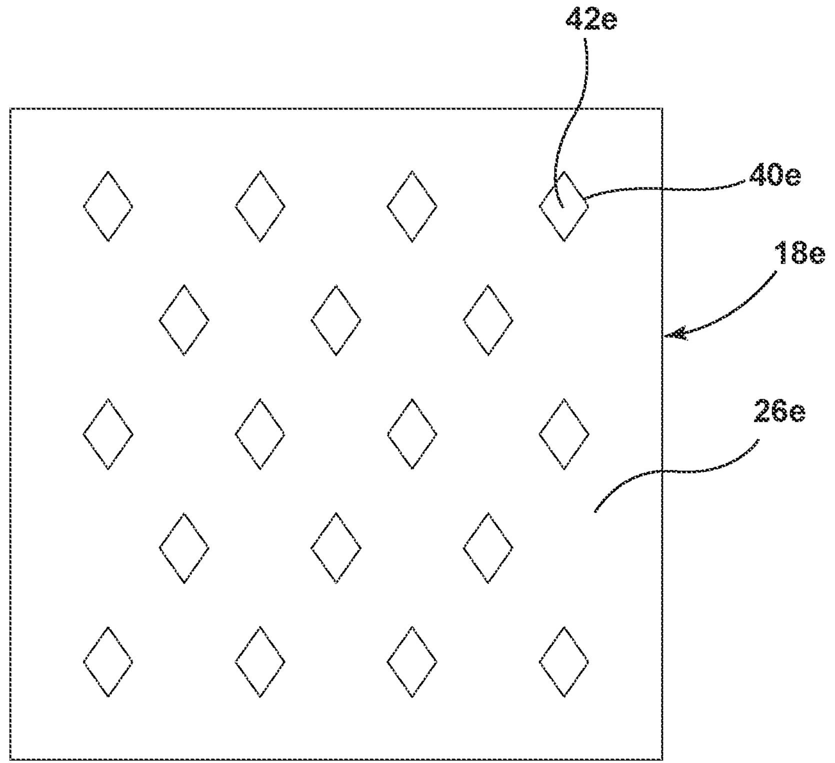
FIG. 6B is a top plan view of the embodiment as illustrated in FIG. 6A.

FIGS. 6A and 6B illustrate yet another alternative embodiment where the reliefs 40*e* are patterned and spaced similarly to the embodiment as illustrated in FIGS. 5A and 5B, with each relief 40*e* being provided a diamond-shaped cross-sectional configuration.

Figure 7A:
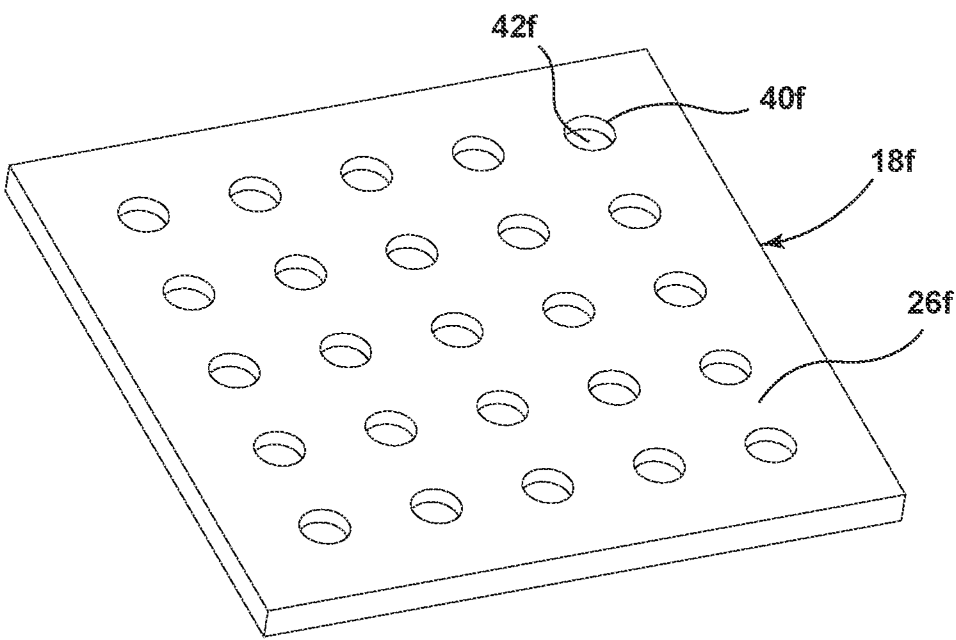
FIG. 7A is a perspective view of an alternative embodiment of the pattern of reliefs where the pattern of reliefs are linearly aligned with one another in a longitudinal and lateral direction and are each provided with a circular cross-sectional configuration.
Figure 7B:
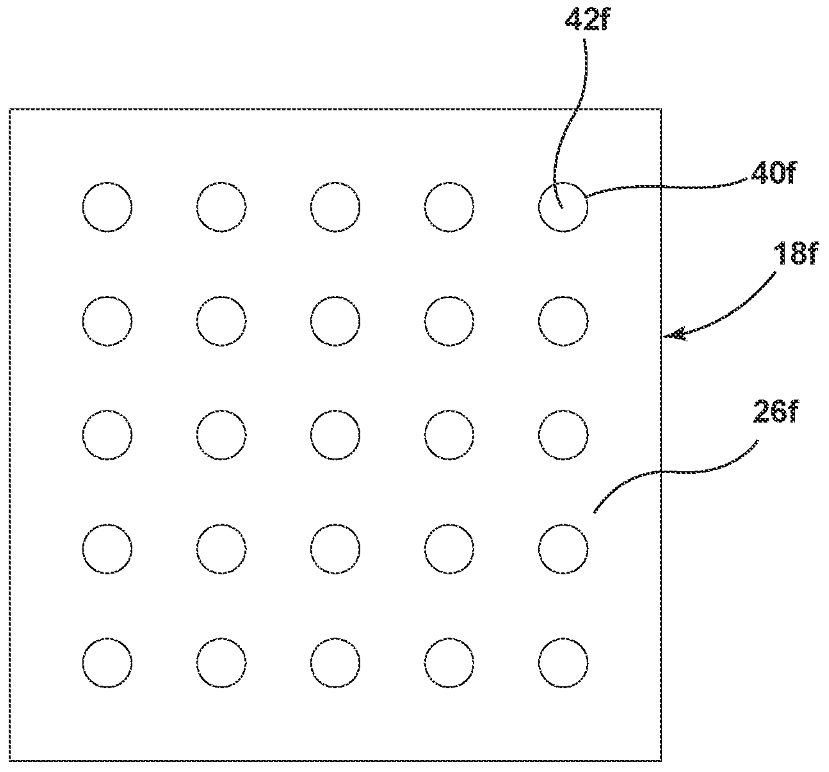
FIG. 7B is a top plan view of the embodiment as illustrated in FIG. 7A.

The embodiment as illustrated in FIGS. 7A and 7B includes a plurality of reliefs 40*f* patterned such that the reliefs 40*f* are both laterally and longitudinally aligned with one another. Each relief 40*f* is provided a circular-cross-sectional configuration similar to that as discussed above with respect to the embodiments as illustrated in FIGS. 1-3A.

Figure 8A:
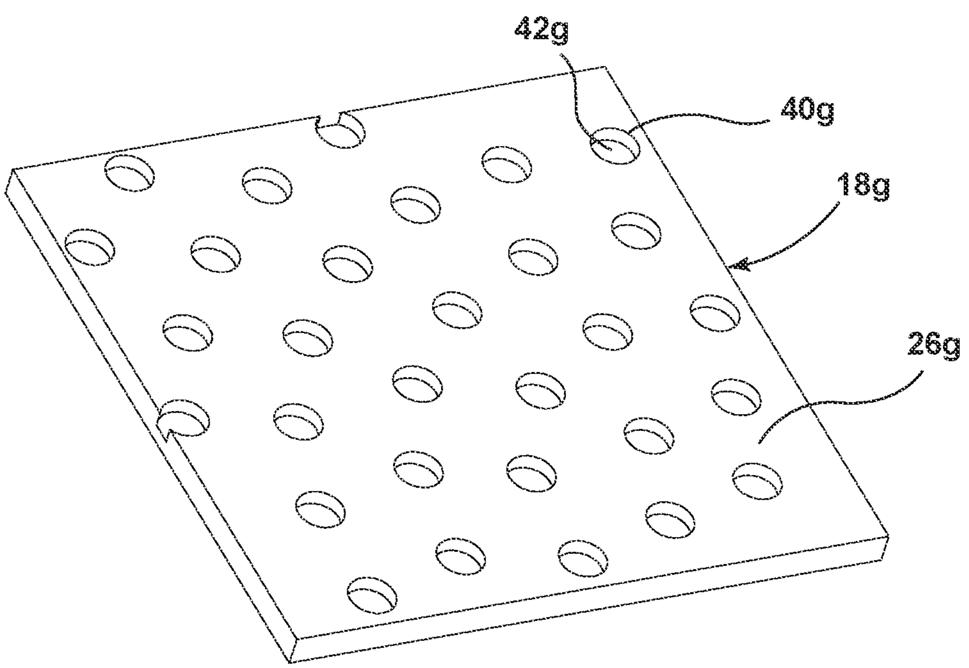
FIG. 8A is a perspective view of an alternative embodiment of the pattern of reliefs where the pattern of reliefs are provided in a plurality of concentric circles and wherein each relief is provided a circular cross-sectional configuration.
Figure 8B:
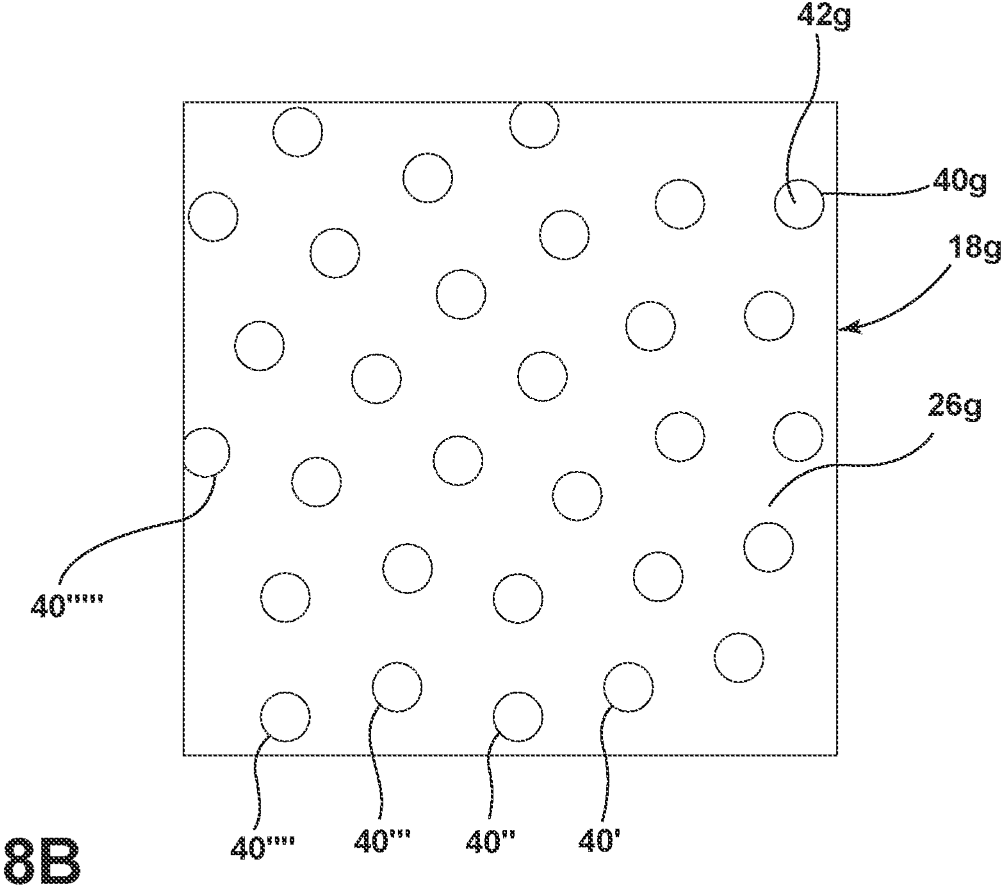
FIG. 8B is a top plan view of the embodiment as illustrated in FIG. 8A.

The embodiment as illustrated in FIGS. 8A and 8B includes a plurality of reliefs 40*g* each having a circularly-shaped cross-sectional configuration and cooperating to form a pattern of concentric circles in the upper surface 26*g* of the fifth wheel hitch plate assembly 18*g*. In the illustrated example, the reliefs 40*g* cooperate to form concentric circles 40', 40", 40'", 40"", 40'"", where the center of the concentric circles 40'-40 is positioned at a location on the fifth wheel hitch plate assembly, namely, point 60. Alternatively, the concentric circles 40'-40'"" may be configured within the upper surface 26*g* of the fifth wheel hitch plate assembly 18*g* such that the center of the concentric circles 40'-40'"" is co-aligned with the pivot axis 38 of the kingpin 36 as described above.

The embodiment disclosed herein provide a fifth wheel hitch arrangement that is relatively lightweight, increases the expected life of the associated components by improving dispersion of lubricants such as grease across a support surface of the associated fifth wheel hitch plate, allows for easy and quick assembly, is economical to manufacture, and is particularly well adapted for the proposed use.

In the foregoing description, it will be readily appreciated by those skilled in the art that modifications may be made to the embodiments as disclosed herein without departing from the concepts as disclosed herein. Such modifications are to be considered as included in the following claims, unless these claims by the language expressly state otherwise.

The invention claimed is:

1. A fifth wheel hitch plate arrangement, comprising:
a mounting portion configured to be coupled to a vehicle frame;
a kingpin throat configured to receive a kingpin of a towed vehicle therein; and
a body portion supported by the mounting portion, the body portion including an upper surface configured to abut a mating surface of the towed vehicle, a bottom surface opposite the upper surface, and a plurality of reliefs extending from the upper surface toward the bottom surface, wherein the plurality of reliefs are closed at a bottom end thereof, wherein the plurality of reliefs are spaced about the upper surface in a repeating pattern such that at least some of the plurality of reliefs are radially offset from one another with respect to a center of the kingpin throat, wherein the body portion includes a fifth wheel plate member and a wear plate member that is separate from and releasably secured to the fifth wheel plate member, and wherein the wear plate member includes the upper surface and the bottom surface of the body portion.

2. The fifth wheel hitch plate arrangement of claim 1, wherein the plurality of reliefs are longitudinally offset from one another across the upper surface.

3. The fifth wheel hitch plate arrangement of claim 1, wherein a first relief of the plurality of reliefs extends from the upper surface to a first depth, and wherein a second relief of the plurality of reliefs extends from the upper surface to a second depth that is different than the first depth.

4. The fifth wheel hitch plate arrangement of claim 1, wherein at least one relief of the plurality of reliefs includes a first portion extending a first depth and a second portion extending to a second depth that is different than the first depth, and wherein the first portion is in fluid communication with the second portion.

5. The fifth wheel hitch plate arrangement of claim 4, wherein a bottom wall of the second portion of the at least one relief is angled with respect to horizontal.

6. The fifth wheel hitch plate arrangement of claim 1, wherein at least one of the reliefs of the plurality of reliefs has a circularly-shaped cross-sectional configuration.

7. The fifth wheel hitch plate arrangement of claim 1, wherein at least one of the reliefs of the plurality of reliefs has a hexagonally-shaped cross-sectional configuration.

8. The fifth wheel hitch plate arrangement of claim 1, wherein at least one of the reliefs of the plurality of reliefs has a diamond-shaped cross-sectional configuration.

9. The fifth wheel hitch plate arrangement of claim 1, wherein the body portion includes a fifth wheel plate member and wear plate member that is separate from the fifth wheel plate member, and wherein the wear plate member includes the upper surface of the body portion and the fifth wheel plate member includes the lower surface of the body portion.

10. A fifth wheel hitch plate arrangement, comprising:
a mounting portion configured to be coupled to a vehicle frame;
a kingpin throat configured to receive a kingpin of a towed vehicle therein; and
a body portion supported by the mounting portion, the body portion including an upper surface configured to abut a mating surface of the towed vehicle, a bottom surface opposite the upper surface, and a plurality of reliefs extending from the upper surface toward the bottom surface, wherein the plurality of reliefs are closed at a bottom end thereof, and wherein the at least one of the plurality of reliefs is equally spaced from at least three adjacent reliefs of the plurality of reliefs.

11. The fifth wheel hitch plate arrangement of claim 10, wherein the plurality of reliefs are equally spaced from one another in a lateral direction across the upper surface.

12. The fifth wheel hitch plate arrangement of claim 10, wherein the plurality of reliefs are equally spaced from one another in a longitudinal direction across the upper surface.

13. The fifth wheel hitch plate arrangement of claim 10, wherein the plurality of reliefs are equally spaced from one another in a diagonal direction across the upper surface.

14. The fifth wheel hitch plate arrangement of claim 10, wherein the plurality of reliefs are longitudinally offset from one another across the upper surface.

15. The fifth wheel hitch plate arrangement of claim 10, wherein at least one of the reliefs of the plurality of reliefs has a circularly-shaped cross-sectional configuration.

16. The fifth wheel hitch plate arrangement of claim 10, wherein a first relief of the plurality of reliefs extends from the upper surface to a first depth, and wherein a second relief of the plurality of reliefs extends from the upper surface to a second depth that is different than the first depth.

17. The fifth wheel hitch plate arrangement of claim 10, wherein the body portion includes a fifth wheel plate member and a wear plate member that is separate from the fifth wheel plate member, and wherein the wear plate member includes the plurality of reliefs.

18. A fifth wheel hitch plate arrangement, comprising:
a mounting portion configured to be coupled to a vehicle frame;
a kingpin throat configured to receive a kingpin of a towed vehicle therein; and
a body portion supported by the mounting portion, the body portion including an upper surface configured to abut a mating surface of the towed vehicle, a bottom surface opposite the upper surface, and a plurality of reliefs extending from the upper surface toward the bottom surface, wherein the plurality of reliefs are closed at a bottom end thereof, and wherein the plurality of reliefs are spaced in concentric circles.

19. The fifth wheel hitch plate arrangement of claim 18, wherein a center of each of the concentric circles are configured to be located proximate a pivot point of a kingpin when the kingpin is fully received within the kingpin throat.

20. The fifth wheel hitch plate arrangement of claim 18, wherein the plurality of reliefs are closed at a bottom end thereof.

21. The fifth wheel hitch plate arrangement of claim 18, wherein at least one of the reliefs of the plurality of reliefs has a hexagonally-shaped cross-sectional configuration.

22. The fifth wheel hitch plate arrangement of claim 18, wherein a first relief of the plurality of reliefs extends from the upper surface to a first depth, and wherein a second relief of the plurality of reliefs extends from the upper surface to a second depth that is different than the first depth.

23. The fifth wheel hitch plate arrangement of claim 18, wherein the body portion includes a fifth wheel plate member and a wear plate member that is separate from the fifth wheel plate member, and wherein the wear plate member the plurality of reliefs.

* * * * *